United States Patent
Decinti et al.

Patent Number: 5,497,303
Date of Patent: Mar. 5, 1996

[54] METHOD AND APPARATUS FOR VEHICLE DETAILING

[76] Inventors: Marco V. Decinti, 9415 Sheridan St., Lanham, Md. 20706; William A. Murray, 2025 W. Old Liberty Rd., Westminster, Md. 21157

[21] Appl. No.: 257,564

[22] Filed: Jun. 10, 1994

[51] Int. Cl.⁶ .................................................. G09F 21/04
[52] U.S. Cl. ............................ 362/80; 362/82; 40/591
[58] Field of Search ............................ 362/80, 82, 249; 40/556, 591; 340/479; 293/102

[56] References Cited

U.S. PATENT DOCUMENTS

| | | | |
|---|---|---|---|
| 1,337,872 | 4/1920 | Zahnow | 362/82 |
| 3,639,748 | 2/1972 | Pearson et al. | 362/82 |
| 3,800,430 | 4/1974 | Samra | 340/95 R |
| 4,172,331 | 10/1979 | Becker | 40/591 |
| 4,745,525 | 5/1988 | Sheehy | 362/80 |
| 4,775,559 | 10/1988 | Kanamori | 428/31 |
| 4,920,460 | 4/1990 | Mori | 362/61 |
| 4,974,125 | 11/1990 | McGehee | 362/82 |
| 5,009,020 | 4/1991 | Watanabe | 40/547 |

*Primary Examiner*—Ira S. Lazarus
*Assistant Examiner*—Sara Sachie Raab
*Attorney, Agent, or Firm*—William H. Holt

[57] ABSTRACT

Methods and apparatus for customizing vehicles with decorative and useful embellishments by modifying standard vehicles with unique lighting through the provision of openings, or orifices, in the form of letters, logos or designs in portions of the vehicle, particularly the rear bumper thereof, to provide enhanced design and safety features. Elements of the invention may be contained in a display-light kit comprised of an assemblage, or package, of light bulb(s), socket(s), wire(s) and reflective lens, along with suitable instructions for guiding a do-it-yourself person in practicing the invention in accordance with the method of equipping a vehicle with the unique display-light and safety signal.

7 Claims, 2 Drawing Sheets

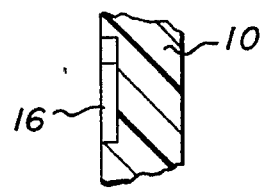
FIG. 3
PRIOR ART
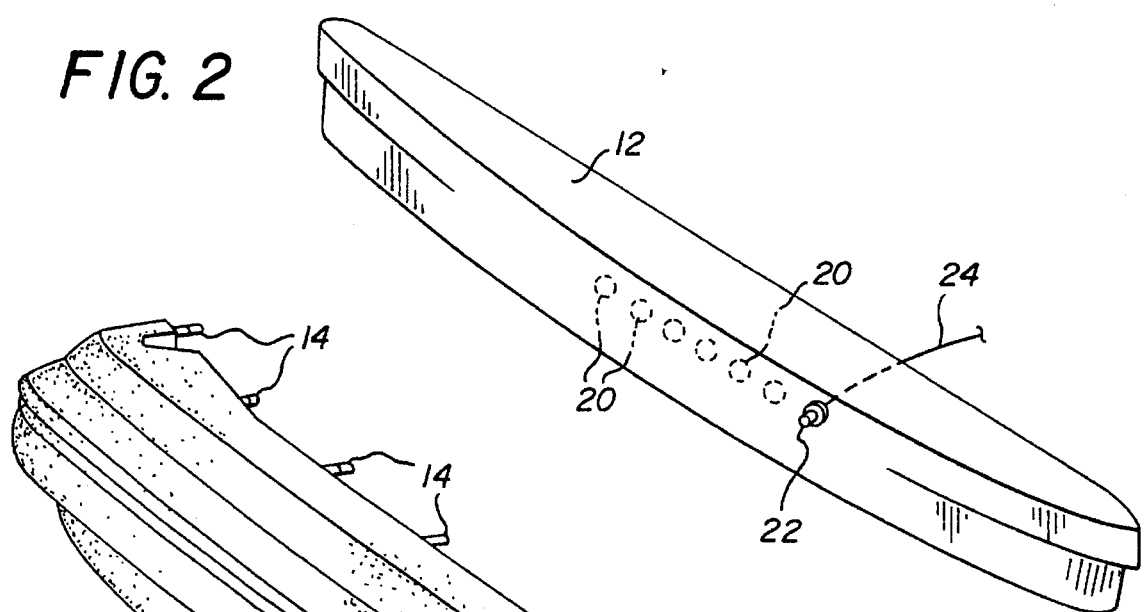
FIG. 2
FIG. 1
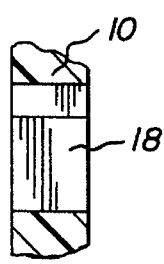
FIG. 4

METHOD AND APPARATUS FOR VEHICLE DETAILING

This invention relates to methods and apparatus useful for customizing vehicles, such as private automobiles, trucks, vans and the like, with decorative and useful embellishments and, more particularly, relates to customizing standard, front or rear, vehicle bumpers, with an opening or openings therethrough. In a preferred embodiment, openings are cut through a rear bumper member so that auxiliary lights may be illuminated in conjunction with the vehicle brake lights, and/or the vehicle tail lights, and shine through the formed openings for providing a unique and decorative detail.

BACKGROUND OF THE INVENTION

Essentially all of the major automobile manufacturers build standard models which may vary annually in some design detail. There are, however, many persons who desire that their personal vehicle(s) have details, or designs, which determine and distinguish the vehicles' appearance and set them apart from the mass-produced standard models. These persons are constantly looking for new ways of customizing the ordinary standard models.

U.S. Pat. Nos. 5,009,020; 4,920,460; 4,775,559; 4,172,331; and 3,800,430 are examples of known prior art which show the use of auxiliary lighting for the front and/or rear portions of vehicles for decorative or utilitarian purposes. A primary distinction between the present invention and the prior art resides in the fact that the preferred embodiment of the present invention contemplates a modification of the standard model vehicle, particularly the bumper thereof, and the connection of auxiliary lighting into the electrical circuit for the braking system.

SUMMARY OF THE INVENTION

This invention relates to methods and products useful for personalizing standard vehicles and, more particularly, to the provision of personal script, lettering, graphics, patterns, abstract art, or other insignia or designs, either inside or outside the vehicle as an item of decoration.

The invention also relates to the provision of additional safety features to a standard vehicle. For example, in a preferred embodiment of the invention, the rear bumper of a vehicle can be provided with openings therethrough; a light source and a suitable lens are affixed and positioned for passing light through the lens upon actuation of the vehicle's braking system thereby providing a visual signal device.

In a specific and particular form, the invention relates to modern vehicle bumpers of the type including a bumper reinforcement and covering, skin or coating of a somewhat pliable, soft urethane or other plastic. Such plastic covering may be of the same or different color than the vehicle; in several current models, such as a "FORD MUSTANG™", "MUSTANG GT™", "SATURN™", "BUICK REGAL GRAND SPORT™", "MITSUBISHI EXPO™", etc., the plastic covering of the standard rear bumper has a trademark of the manufacturer pressed or molded therein.

In one preferred embodiment of the invention, the aforementioned bumper is modified by removing the impressed trademark by cutting or routing or sawing through the plastic covering thus providing a defined opening therethrough. A light source, or series of lights, is to be mounted for shining light through the opening thus illuminating it in a manner not heretofore known. The light source may be wired into the vehicle electrical system so as to be actuated, for example, along with the conventional vehicle tail lights, but preferably is to be actuated in conjunction with the vehicle brake lights. In this latter orientation, application of the brakes sends an additional signal to following vehicles.

In those instances of applying the invention to the front bumper, or to the side panels of the vehicle, by cutting away existing lettering, logos or insignia, or creating personalized script or designs, it is preferred that the light source be activated with the vehicle running lights, rather than being intermittently operated with the brake lights.

In its broadest aspect, the present invention is applicable to any portion of a vehicle through the provision of forming or creating an opening and mounting a light source for passing visible light therethrough. The openings are preferably covered by, or provided with, a lens material of the type having a reflective or etched surface that deflects, diffuses or scatters light passing therethrough. The lens may be clear or colored; when the invention is applied at the rear of the vehicle, it is preferred that the lens be made of red colored Plexiglass® plastic, or the like.

BRIEF DESCRIPTION OF THE DRAWINGS

FIG. 1 is a perspective view of a contemporary vehicle bumper with the outer, visible covering thereof formed of a molded plastic covering or sheath.

FIG. 2 is a perspective view of a bumper reinforcement which is the force absorbing back member for the covering of FIG. 1, and illustrates one form of the invention wherein light bulbs and sockets are snapped into openings formed in alignment with openings formed in the cover.

FIG. 3 is a fragmentary sectional view exemplifying the prior art, taken along the line 3—3 in FIG. 1, showing the letter "T" embossed or pressed into the standard plastic covering for the bumper.

FIG. 4 is a fragmentary sectional view of the invention, taken along the line 4—4 of FIG. 1, showing the letter "T" having been cut, reamed, or otherwise removed so as to provide an opening through the plastic covering.

DETAILED DESCRIPTION

Figure 5:
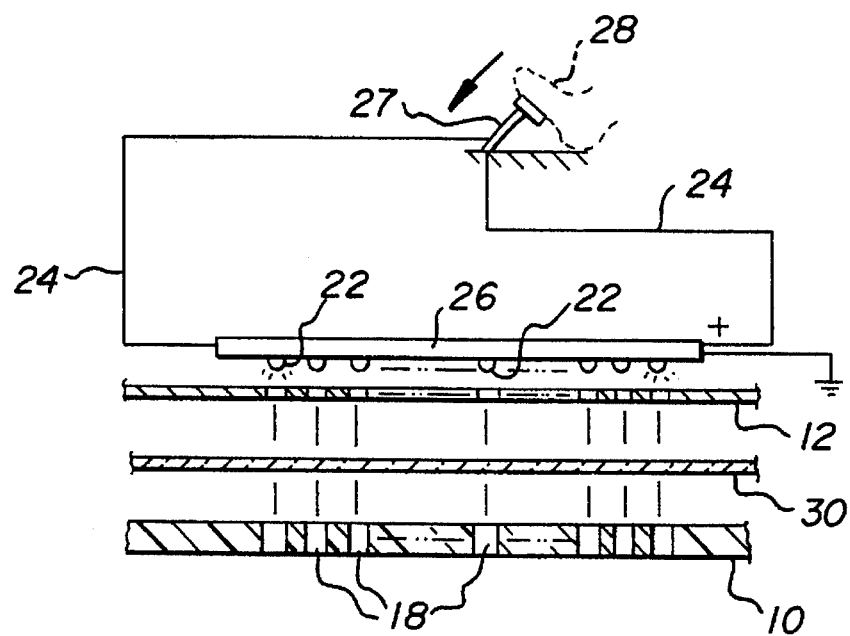
FIG. 5 is a schematic view showing elements of the invention separated for clarity and including a wiring diagram illustrating the light source connected into the electrical circuitry of a vehicle brake system.

Referring to the drawings, the invention is illustrated in FIG. 1 as being applied to a rear bumper cover, generally indicated by the numeral 10, of a typical automobile such as a "FORD MUSTANG™" automobile (not shown). The bumper cover, skin or coating 10 is of the type which is comprised of a molded pliable plastic material which covers and is backed-up by a bumper reinforcement member 12, as is best shown in FIG. 2. Member 12 is formed of a relatively heavy gauge metal for absorbing energy from somewhat minor impacts for minimizing or reducing structural damage to the vehicle and/or bodily injury to the occupants. The bumper cover 10 and bumper reinforcement member 12 are to fastened to the vehicle chassis by a series of bolts 14 so that the cover 10 is slightly spaced from member 12.

FIGS. 3 and 4 are fragmentary sectional views which show, respectively, a letter or symbol 16 which has been impressed, molded or stamped by the manufacturer into the conventional, prior art, bumper cover 10, and an opening 18 which has been formed through the bumper cover 10, in accordance with the present invention, by the use of any tool such as a knife, router, punch, or die for cutting, piercing, puncturing or penetrating completely through the bumper cover 10, all for a purpose to be hereinafter described.

As is indicated in FIG. 2, a plurality of openings, indicated by dotted circles 20, are formed on the order of approximately 5/8's of an inch to receive a small light source or bulb 22 which is to be connected into an electrical circuit by a wire 24. One form of light source that is presently available, and contemplated, is generally referred to as a "peanut bulb" which can be mounted in an electrical socket secured into each of the openings 20 of the bumper reinforcement member 12; however, other light sources may be used.

As is shown in FIG. 5, a series of bulbs 22 are mounted upon a socket fixture or board 26 which may be secured to or form part of, bumper reinforcement member 12 so that the bulbs 22 are aligned with the openings 18 which pass through the bumper cover (skin or coating) 10. Electricity passing through the wire 24 will cause the bulbs to glow and pass light through the bumper cover 10 to be seen from, for example, the rear of the vehicle.

The bulbs 22 may be connected into the circuit which controls the various vehicle lights, including but not limited to the headlights, tail lights, parking lights, etc.; however, in one preferred form of the invention, bulbs 22 and wire 24 are connected into the brake light circuit of the vehicle so that bulbs 22 emit light whenever the vehicle brake pedal 27 is operated by the foot 28 of the vehicle driver, thus sending an additional, and unique, visible signal to an observer, including the operator of a following vehicle (not shown).

It is contemplated that a transparent lens or sheet member 30, formed of diamond-cut, plastic, reflective material, which may be clear or, if preferred, colored red, be interposed between the lights 22 and the openings 18 so that light from the bulbs 22 is enhanced. Ideally, in the form of the invention wherein the lights 22 are connected into the vehicle braking system, the lens 30 is colored red so that light therethrough complements the traditional red light of conventional braking systems.

Figure 6:
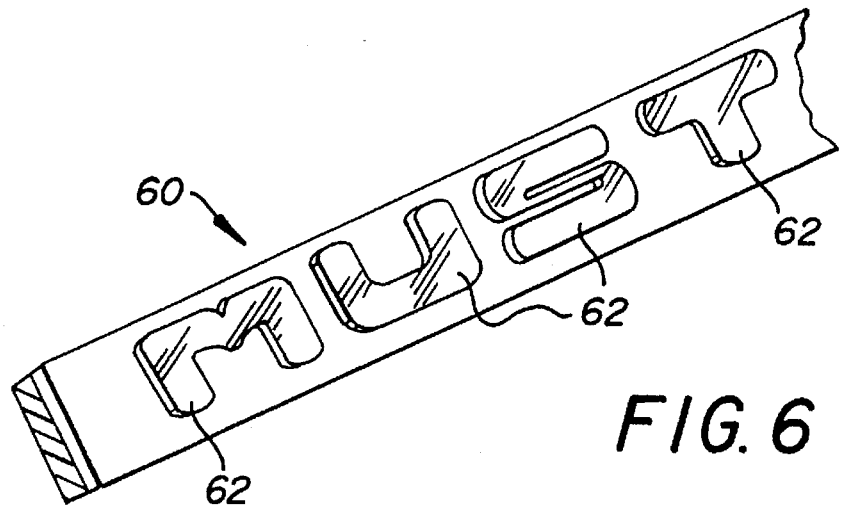
FIG. 6 is a fragmentary perspective view of a lens formed of two layers of material, one being translucent and having facetted crystalline faces thereon and the other layer being transparent and preferably red in color.
Figures 7, 8:
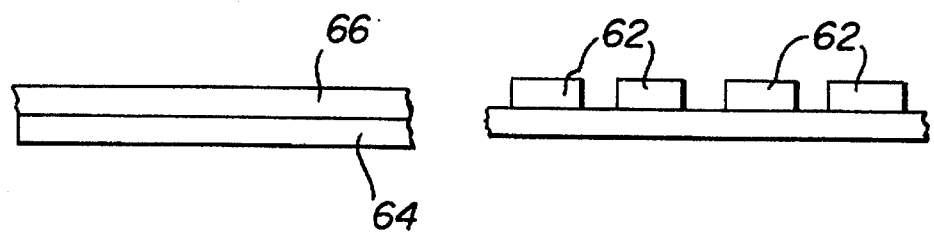
FIG. 7 is a fragmentary elevational view showing two layers of material making up the lens of FIG. 6 prior to formation of the lettering thereon.
FIG. 8 is a fragmentary elevational view showing the lens of FIG. 6 with the letters formed in relief.

FIGS. 6, 7 and 8 illustrate a variation of the invention wherein a lens, generally indicated by the numeral 60, may be custom made by cutting, stamping or molding, etc., to provide raised letters 62, or other indicia such as logos and the like, which will fit within openings 18 in the member 10 to thereby provide a smooth surface that provides a professionally finished look and appearance to the vehicle bumper, or other vehicle surface. The finished lens 60, best shown in FIGS. 6 and 8, may be formed from the stock material shown in FIG. 7 wherein one material layer 64 is formed of clear, diamond-cut, crystalline-like, plastic material for diffusing light, and the other material layer 66 is red-colored and transparent or translucent for coloring light emitted from bulbs 22, or the like. The raised letters shown in FIG. 8 may be sized to fit into the individual openings 18 in the bumper cover 10. Likewise, the bumper cover 10 may be provided with a single, large, preferably rectangular opening so that lens 60 may be mounted therein in one piece. In either form, light will shine through and emit a unique form of signal.

The invention contemplates a method of equipping a vehicle with a customized light for decorative and utilitarian purposes wherein an opening is formed in a portion of a vehicle, and light transmitting means is located for emitting light through the opening. It is contemplated that the opening may be formed in almost any portion of the vehicle, e.g., the hood, side panels, dash board, rear quarter panels, truck lid or, in a preferred embodiment of the invention, indicia in the form of an opening, or openings, are formed in the rear bumper of the vehicle by piercing, cutting, or otherwise, and locating a light source adjacent to the opening(s) for emitting light therethrough. Lens means are provided for enhancing the emitted light; the lens may be colored so that, for example, the light source may be connected with the conventional vehicle brake system for providing a distinctive and unique signal.

The invention contemplates the provision of a display-light kit comprised of the various elements, including bulbs 22, wires 24, sockets 26, and lens materials 30 or 64, and 66, as well as written instructions for practicing the process according to the invention.

While the invention has been illustrated in the form of providing indicia in the form of an enhanced decorative detail to a Ford Mustang automobile, and particularly the rear bumper portion thereof, it is to be understood that various modifications and changes may be made by those skilled in the art without departing from the spirit and scope of the invention as defined by the appended claimed subject matter.

We claim:

1. A display light in combination with a vehicle, said display light including a light source, mounting means for mounting said light source adjacent an orifice formed in a portion of a vehicle, translucent lens means capable of passing light from said light source through said orifice for providing decorative indicia, and means for mounting said lens means in alignment with said light source for passing light through the vehicle orifice, said portion of a vehicle being of a plastic cover member (10), and said indicia being in the form of letters cut through said plastic cover member.

2. A display light as defined in claim 1 wherein said plastic cover member (10) is mounted upon a vehicle in combination with and separated by a space from a bumper reinforcement member (12), said light source being mounted in said space for emitting light through said translucent lens means.

3. A display light as defined in claim 2 wherein said lens means comprises raised indicia (62) fitted within said orifice and forming a smooth surface with said plastic cover member.

4. A method of equipping a vehicle with a display light, said method comprising the steps of:
   a. forming an opening in a portion of a vehicle for providing indicia means therein;
   b. locating a light source adjacent to said opening for emitting light through said opening for illuminating said indicia; and
   c. including a light transmitting lens means along said portion of the vehicle adjacent to said light source and said opening for passing light through said lens means,
   d. wherein the step of forming an opening in a portion of a vehicle includes the step of piercing said vehicle portion for forming said indicia therethrough; and wherein the step of forming an opening in a portion of a vehicle includes forming said opening in a bumper member of the vehicle through the step of removing the bumper member from the vehicle, and cutting at least a first opening through said bumper member for forming said indicia to be illuminated by said light source.

5. A method of equipping a vehicle with a display light, said method comprising the steps of:
   a. forming an opening in a portion of a vehicle for providing indicia means therein;
   b. locating a light source adjacent to said opening for emitting light through said opening for illuminating said indicia; and
   c. including a light transmitting lens means along said portion of the vehicle adjacent to said light source, and said opening for passing light through said lens means,
   d. wherein the step of forming an opening in a portion of a vehicle includes the step of piercing said vehicle portion for forming said indicia therethrough; and wherein the step of forming an opening in a portion of a vehicle includes the step of cutting letters through a bumper member of the vehicle.

6. A method as defined in claim 5 including the step of connecting said light source in an electrical circuit which includes the vehicle brake pedal and brake lights for illuminating said light source simultaneously with said brake lights to emit light through said bumper member for providing an enhanced brake signal.

7. A method of equipping a vehicle with a display light, said method comprising the steps of:
   a. forming an opening in a portion of a vehicle for providing indicia means therein;
   b. locating a light source adjacent to said opening for emitting light through said opening for illuminating said indicia; and
   c. including a light transmitting lens means along said portion of the vehicle adjacent to said light source and said opening for passing light through said lens means,
   d. wherein the step of forming an opening in a portion of a vehicle includes the step of piercing said vehicle portion for forming said indicia therethrough; and wherein said vehicle portion is a plastic bumper cover (10) spaced from a reinforcement member (12), and wherein the step of including said light transmitting lens means includes the step of locating said lens means in said opening for providing a smooth surface with said plastic bumper cover.

* * * * *